United States Patent [19]

Bjorshol

[11] 4,068,399

[45] Jan. 17, 1978

[54] APPARATUS FOR USE IN LONG-LINE FISHING

[76] Inventor: Kolbjörn Björshol, 6560 Langoyneset, Norway

[21] Appl. No.: 686,099

[22] Filed: May 13, 1976

[30] Foreign Application Priority Data

May 16, 1975  Norway .................................. 751750

[51] Int. Cl.² ............................................. A01K 79/00
[52] U.S. Cl. ......................................... 43/4.5; 43/26.1
[58] Field of Search .................... 43/54.5 A, 4.5, 26.1, 43/27.4, 44.83, 44.84, 6.5; 29/453; 24/237

[56] References Cited

U.S. PATENT DOCUMENTS

| 1,533,044 | 4/1925 | Smith | 43/44.86 |
| 3,210,883 | 10/1965 | Ulsh | 43/44.83 |
| 3,533,184 | 10/1970 | Kerr | 43/44.84 |

FOREIGN PATENT DOCUMENTS

| 988,545 | 5/1976 | Canada | 43/4 |
| 125,958 | 6/1973 | Norway. | |
| 116,942 | 3/1969 | Norway. | |
| 218,561 | 7/1969 | U.S.S.R. | 43/27.4 |

OTHER PUBLICATIONS

"Design for Mechanical Longline Handling", World Fishing, vol. 18, No. 5, May 1969, p. 45.

Primary Examiner—Louis G. Mancene
Assistant Examiner—Peter K. Skiff
Attorney, Agent, or Firm—Watson, Cole, Grindle & Watson

[57] ABSTRACT

The invention relates to an apparatus for use in long-line fishing, adapted to separately advance long-line snoods and fishing hooks, respectively, to a position in a blow device adapted to force the fishing hook necks individually into secured engagement with a head provided on each fishing line snood, possibly under simultaneous positioning of a bait on each fishing hook neck.

5 Claims, 3 Drawing Figures

U.S. Patent  Jan. 17, 1978  4,068,399
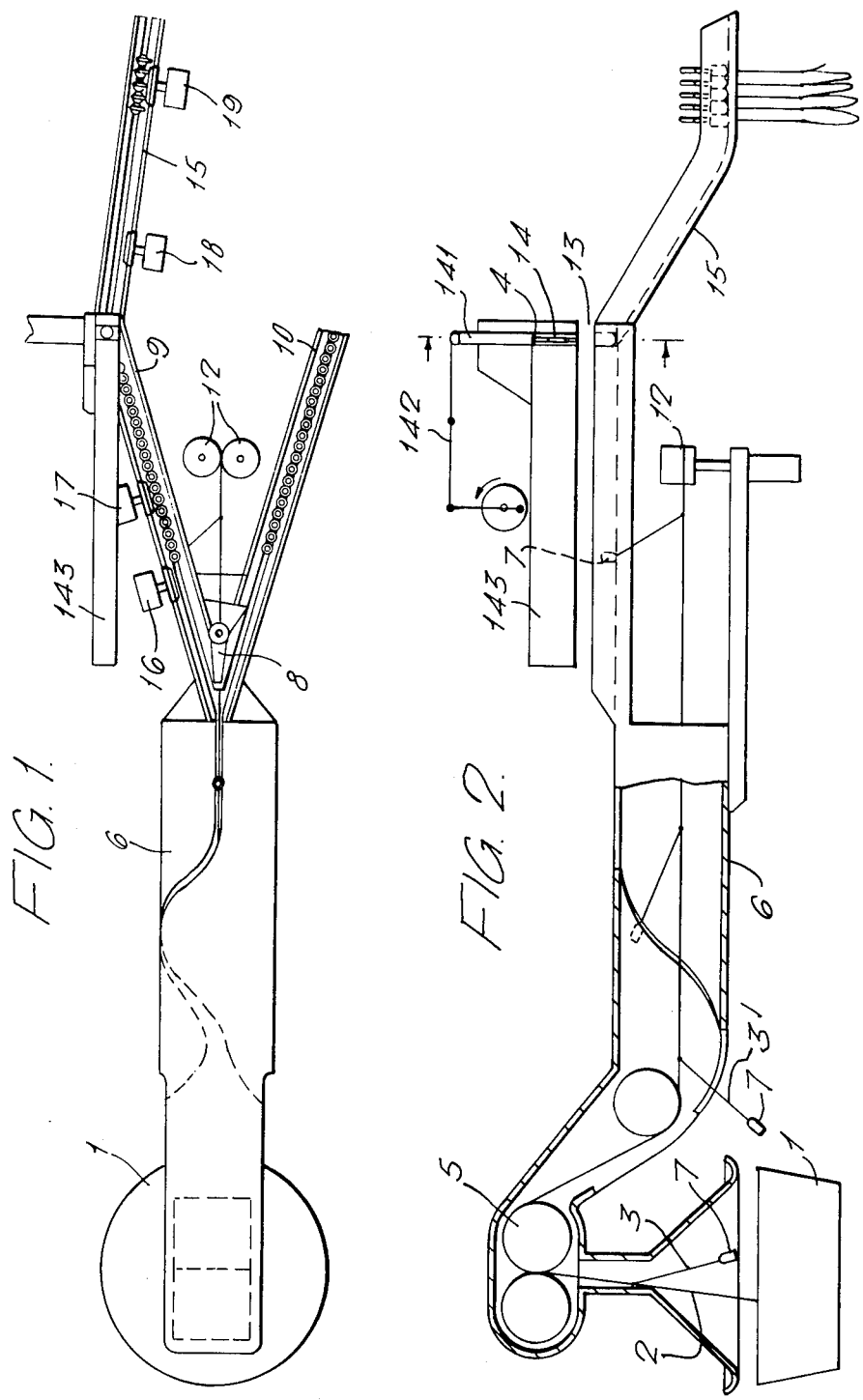
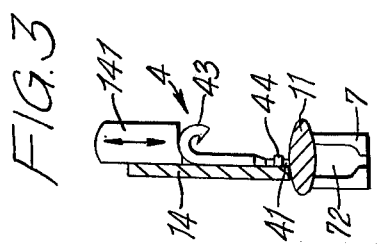

APPARATUS FOR USE IN LONG-LINE FISHING

In long-line fishing, also called great-line fishing or boulter or trot fishing, a line is used which is provided with a great number of hooks each connected to the line through a so-called snood. During fishing, each hook is provided with bait, and when the line is not in use, care must be taken that the line and the appertaining snoods are to the greatest possible extent prevented from being tangled or knotted.

The present invention relates to an apparatus which makes it possible to easily and surely connect the individual hooks with their snoods, baiting of the hooks being effected simultaneously with or independent of the hooking of the snoods, i.e. the interconnection of the hooks and the snoods. After use, the individual hooks may then be disconnected from the appertaining snoods so that the line, with all its snoods, may be stored in a tub from which it is easily drawn for re-use without any danger of tangling.

According to the invention, the hooking is effected by means of an apparatus which comprises at least one hook store adapted for individual advancing and dispensing of fish hooks, at least one passage for advancing snoods each provided with a snood head, and a blow device adapted to force at least one hook neck into secured engagement with a corresponding snood head. Through a suitable forming of the individual parts of the apparatus and a suitable arrangement of the parts relatively to each other, it is made possible to perform the hooking such that each snood is provided with a hook and no hook is left over.

According to one feature of the invention, the passage or passages for advancing the snoods is or are adapted to also receive individual baits which are advanced together with the snoods and arrive individually in the blow device in a position between the hook neck and the snood head which are to be interconnected, such that the bait is penetrated and each individual hook is baited simultaneously with its interconnection with the corresponding snood head. Further features of the apparatus according to the present invention will appear from the following description and claims and the accompanying drawing which schematically illustrates an embodiment of the apparatus.

In the drawing,

FIGS. 1 and 2 are views, partly in section, of the apparatus as seen from the above and from one side, respectively, while FIG. 3 is a sectional view, at a larger scale, through the blow device.

The embodiment of the apparatus shown in the drawing, and now to be described, is adapted for simultaneous baiting and hooking.

In the apparatus shown in the drawing, 1 is a line tub or other container adapted for the storing of a line 2 provided with a great number of snoods 3, each provided with a head 7, but without any hooks 4. From the tub 1, the line 2 is carried between rollers 5 to and into a slotted tube formed passage 6, the snoods 3 with their heads 7 being guided in the slot which conveniently is formed such that a snood 3' which is advanced with its head 7 depending downwardly, is guided so that the head 7 is pointing upwardly when the snood is arriving in the position for baiting and hooking. At the right hand end of the passage 6, FIG. 1 illustrates that the same is divided into a pair of passages 9 and 10, respectively, into which the snoods are fed alternatively by means of a switch tongue 8 for the purpose of advancing the snoods alternatively to one or the other of two hooking and baiting stations, represented by the blow device shown in FIG. 3. In FIG. 1, only the station appertaining to the passage 9 is shown, for the purpose of not cluttering the drawing. The purpose of the splitting of the passage 6 into a pair of passages 9 and 10, respectively, is to increase the number of snoods which per time unit are interconnected with their individual hooks. As shown, the passages 9 and 10 are also advancing bait 11, which are individually brought on to a snood head 7, as shown in FIG. 3, while the line 2 proper is advanced from the switch 8 to draw rollers 12, independently of the hooking and baiting procedure.

When the individual snoods are arriving at the position indicated at 13 in FIG. 2 and shown at a greater scale in FIG. 3, bait 11 is positioned on top of the snood head 7. When a hook 4 is then forced downwardly through a guide 14, the pointed end 41 of the hook neck 42 is passed through the bait 11 and, when the hook 4 is carried further downwardly, the bait is pushed upwardly along the hook neck 42 and is, finally, pushed on to the hook point 43 from the free end of the same. The hooked and baited snood 3 is then carried along in a passage 15 and run into the sea.

In connection with the passages 9 and 10, feeler devices 16 and 17, only indicated in relation to passage 9 in the drawing, are provided for the purpose of giving indications regarding the number of snood heads present in the passage between such devices. Feelers 18 and 19 are also shown provided in relation to the output passage 15 for the purpose of indicating the conditions in the passage.

The baiting device proper comprises, as mentioned and as shown in FIGS. 2 and 3, a guide 14 in which a piston 141 may perform a reciprocating vertical movement under the influence of for instance a crank device 142. The guide 14 is receiving hooks 4, one by one from a hook store 143, the individual hooks being subjected to a blow from the piston 141 for the purpose of being forced downwardly into a snood head 7 which is advanced through the appropriate passage 9 or 10, as described above. In FIG. 1 only one baiting device is shown, but obviously a similar device is arranged at the end of the passage 10, with adjoining output passage 15.

A hook and a snood head particularly suited for use in an apparatus according to the invention may be as disclosed in the copending application Ser. No. 686,101, filed on May 23, 1976. A hook and a snood head of that type is indicated in FIG. 3, in which the hook neck 42 is provided with a thickened portion 44 adapted to cooperate with and to be held in a cavity 72 in the snood head 7. The walls of such cavity 72 are made resilient, so that they may yield under the introduction and removal, respectively, of the hook neck portion 42.

I claim:

1. An apparatus for use in long-line fishing, comprising at least one fishing hook store adapted for individual advancing of fishing hooks, at least one passage adapted to advance a series of snoods each attached to a fishing line and provided with a snood head and at least one blow device, each adapted to force a fishing hook neck into secured engagement with a snood head.

2. An apparatus as claimed in claim 1, comprising a pair of snood advancing passages and a switching device adapted to direct succesive snoods alternatively to one and the other of the two snood advancing passages.

3. An apparatus as claimed in claim 1, comprising a device adapted to advance bait for individual positioning between a fishing hook neck and a snood head in the blow device.

4. An apparatus as claimed in claim 1 wherein each blow device comprises a guide adapted to receive a fishing hook, a piston reciprocable in the guide, and means for reciprocating the piston.

5. An apparatus as claimed in claim 2 wherein the pair of snood advancing passages receive snoods advanced from a slotted tube formed passage, the slot of the passage guiding the advancing snoods into an upwardly pointing position.

* * * * *